United States Patent
Langet et al.

(10) Patent No.: US 9,058,688 B2
(45) Date of Patent: Jun. 16, 2015

(54) TOMOGRAPHIC RECONSTRUCTION OF AN OBJECT IN MOTION

(75) Inventors: Hélène Langet, Sèvres (FR); Cyril Riddell, Issy-les-Moulineaux (FR)

(73) Assignee: GENERAL ELECTRIC COMPANY, Schenectady, NY (US)

(*) Notice: Subject to any disclaimer, the term of this patent is extended or adjusted under 35 U.S.C. 154(b) by 566 days.

(21) Appl. No.: 13/328,427

(22) Filed: Dec. 16, 2011

(65) Prior Publication Data

US 2012/0163532 A1    Jun. 28, 2012

(30) Foreign Application Priority Data

Dec. 23, 2010   (FR) ...................................... 10 61185

(51) Int. Cl.
  *A61B 6/03*   (2006.01)
  *G06T 11/00*  (2006.01)

(52) U.S. Cl.
  CPC ......... *G06T 11/006* (2013.01); *G06T 2211/404* (2013.01); *G06T 2211/424* (2013.01)

(58) Field of Classification Search
  CPC ............ G06T 11/006; G06T 2211/404; G06T 2211/424; G06T 2211/412; A61B 6/486
  USPC ............................................. 378/19; 382/131
  See application file for complete search history.

(56) References Cited

U.S. PATENT DOCUMENTS

| | | | |
|---|---|---|---|
| 2009/0074277 A1* | 3/2009 | Deinzer et al. | 382/130 |
| 2009/0161932 A1 | 6/2009 | Chen | |
| 2010/0166267 A1 | 7/2010 | Zhang et al. | |

FOREIGN PATENT DOCUMENTS

| | | |
|---|---|---|
| CN | 101553171 A | 10/2009 |
| CN | 101558293 A | 10/2009 |
| DE | 102008007830 A1 | 8/2009 |
| JP | 2010233762 A | 10/2010 |

OTHER PUBLICATIONS

French Search Report dated Apr. 12, 2011 which was issued in connection with the French Application No. 1061185 which was filed on Dec. 23, 2010.

(Continued)

*Primary Examiner* — David J Makiya
*Assistant Examiner* — John Corbett
(74) *Attorney, Agent, or Firm* — GE Global Patent Operation; Marc A. Vivenzio

(57) ABSTRACT

A method for processing a sequence of a plurality of 2D projection images of an object of interest, acquired with a medical imaging system comprising a source of X-rays adapted to move around the object is provided. The method comprises obtaining 2D projection images of the object of interest according to a plurality of angulations at a first time when the object is without injection of a contrast product; obtaining 2D projection images of the object of interest according to a plurality of angulations at a second time when the object is opacified by injection of a contrast product iteratively treating the projection images by minimizing relative to a sequence of 3D images, wherein the minimizing solution is a set of estimated 3D images.

9 Claims, 4 Drawing Sheets

(56) References Cited

OTHER PUBLICATIONS

Chen Guang-Hong et. al.: "Prior image constrained compressed sensing (PICCS): A method to accurately reconstruct dynamic CT images from highly undersampled projection data sets", Medical Physics, AIP, Melville, NY, US, vol. 35, No. 2, Jan. 28, 2008, pp. 660-663, XP012115917, ISSN: 0094-2450, DOI: DOI: 10.1118/1.2836423.

Mark Supanich et. al.: "Radiation dose reduction in time-resolved CT angiography using highly constrained back projection reconstruction; Radiation dose reduction in time-resolved CTA using HYPR reconstruction", Physics in Medicine and Biology, Taylor and Francis Ltd. London, GB, vol. 54, No. 14, Jul. 21, 2009, pp. 4575-4593, XP020158912, ISSN: 0031-9155.

Search Report and Written Opinion from corresponding EP Application No. 11193790 dated Apr. 19, 2012.

Chen Guang-Hong et al., "Prior image constrained compressed sensing (PICCS): A method to accurately reconstruct dynamic CT images from highly undersampled projection data sets", Medical Physics, vol. 35, No. 2, pp. 660-663, Jan. 28, 2008.

Mark Supanich et al., "Radiation dose reduction in time-resolved CT angiography using highly constrained back projection reconstruction; Radiation dose reduction in time-resolved CTA using HYPR reconstruction", Physics in Medicine and Biology, vol. 54, No. 14, pp. 4575-4593, Jul. 21, 2009.

Riddell et al., "Frequency Weighted Least Squares Reconstruction of Truncated Transmission SPECT Data", IEEE Transactions on Nuclear Science, vol. 43, Issue No. 4, pp. 2292-2298, Aug. 1996.

Afonso et al., "Fast Image Recovery Using Variable Splitting and Constrained Optimization", IEEE Transactions on Image Processing, vol. No. 19, Issue No. 9, pp. 2345-2356, Sep. 2010.

Thibault et al., "A Three-Dimensional Statistical Approach to Improved Image Quality for Multislice Helical CT", Medical Physics, vol. No. 34, Issue No. 11, pp. 4526-4544, Nov. 2007.

Beck et al., "Fast Gradient-Based Algorithms for Constrained Total Variation Image Denoising and Deblurring Problems", IEEE Transactions on Image Processing, vol. No. 18, Issue No. 11, pp. 2419-2434, Nov. 2009.

Unofficial translation of Chinese Search Report from corresponding CN Patent Application No. 2011104632488 dated Sep. 24, 2014.

\* cited by examiner

TOMOGRAPHIC RECONSTRUCTION OF AN OBJECT IN MOTION

BACKGROUND OF THE INVENTION

1. Field of the Invention

The present disclosure relates to the field of tomographic reconstruction and more particularly to the reconstruction of a sequence of 3D image(s) describing an object to be imaged by means of a contrast product.

2. Description of the Prior Art

Tomography allows making images of slices of a region of interest of an object by acquiring projections.

FIG. 1 schematically illustrates the acquisition of 2D images of an organ and the tomographic reconstruction of a 3D image of this organ. Reconstruction of a 3D image by tomography consists of emitting X-rays 10 from a source to the organ 12, the X-rays being emitted according to different angulations $l \in \{1, \ldots, L\}$ which define the trajectory $T_r$ of the source (commonly rotation, also known as spin).

After having passed through the organ 12, the X-rays 10 are detected by a detector 13 to form a set of 2D projections. There are as many 2D projections acquired as relevant angulations (or L projections for the trajectory). Acquisition is carried out by a detector (not shown) located opposite the source of X-rays 11. The detector may be, for example, a digital camera.

One application of tomography is the detection and characterisation of a lesion in an organ, for example, stenosis in a vessel of a patient.

The acquired 2D projections are used to reconstruct a 3D image of the object. This 3D image is more precisely a 3D map of the coefficients of attenuation to X-rays of the traversed medium. Using this map, the radiological practitioner interprets this image as a function of the differences in contrast observed.

An iterative 3D reconstruction process is known. This process is based on a discrete and matricial expression of the problem of tomographic reconstruction. Such a process is carried out in a processing unit of a medical imaging system. More precisely, the problem is modelled by the following equation:

$$Rf = p,$$

where p is the set of L projections acquired, R is a projection operator which models the tomographic imaging system and its trajectory of acquisition of L projections p, and f is the 3D image of the object to be reconstructed.

The problem of tomographic reconstruction is determining f by knowing p and R. A known solution to the equation mentioned hereinabove is the resolution of the following criterion:

$$\begin{cases} Q(g) = \frac{1}{2} \|Rg - p\|_2^2 \\ g^* = \underset{g}{\operatorname{argmin}} Q(g) \end{cases}$$

where $\| \|_2$ symbolises the Euclidian standard said $L_2$.

Minimization of the criterion Q(g) relative to g gives good results ($g^* \approx f$) when the set of projections p is such that L is large (typically a few hundreds) and when the set of L angulations covers at least 180° degrees. These conditions are commonly verified when the organ is static during the time necessary to effect a rotation of the imaging system.

A problem arises in getting an image of the blood vessels which do not show a marked difference in contrast relative to the surrounding tissue. It is therefore necessary to inject a so-called "contrast" product, for example an iodised product, into the vessels so as to make them more opaque to X-rays and allow them to be displayed as much in 2D projections as in associated 3D reconstructions. The image of the vessels alone is obtained by subtracted angiography where two acquisitions are made: one without contrast product, known as "mask" and noted $p_M$, and a second one, known as "opacified" and noted $p_O$, identical in terms of geometry, but after injection of the contrast product. The order in which these acquisitions are done does not matter. The image of the vessels in the images is obtained by opacified subtraction minus mask. Subtracted tomographic acquisition occurs therefore as the succession of two tomographic acquisitions, masked and opacified, such that an image of the acquisition mask (same geometry) allowing subtraction corresponds to each image of the opacified acquisition.

The 3D mask images, noted $f_M$, opacified, noted $f_O$, and subtracted, noted $f_S$, are respectively defined as the solutions to the problems $Rf_M = p_M$, $Rf_O = p_O$ and $Rf_S = p_O - p_M$. They are linked by the relationship $f_S = f_O - f_M$ and by the symbol R common to all three problems, which translates the geometric identity of the spins and consequently the possibility of subtraction of data $p_O - p_M$.

The contrast product dilutes rapidly in the blood flow. The maximal rotation speed of the tomographic system is generally used to limit the volume of contrast product necessary for opacified acquisition. The angular sampling conditions of the tomography also involve obtaining a few hundreds of images by acquisition, commonly 600. Angiography systems are however limited in speed of rotation, commonly 40°/s, and in image rate, commonly 50 Hz, such that the total number of images acquired, for example 250, is sufficient for the display of strong contrasts such as bones and opacified vessels, but insufficient for weak contrasts, such as soft tissue and perfused tissue. It is said that contrast resolution is limited by sampling. The 3D image subtracted from the contrast product alone (opacified vessels and perfused tissue) suffers under the same limitations of sampling, although it is the result of two acquisitions, simply because these two acquisitions reproduce the same limited sampling enabling subtraction of 2D projections instead of being complementary to enable an increase in contrast resolution.

Reference is now made to the general case where the acquisition mask is modelled by the operator $R_M$, and acquisition opacified by the operator $R_O$. The 3D images $f_M$ and $f_O$ are respectively defined by $R_M f_M = p_M$ and $R_O f_O = p_O$ and are linked by the relationship $f_S = f_O - f_M$. As the hypothesis $R_M = R_O$, is no longer necessarily done, the subtraction of data can no longer be written; generation of the subtracted 3D image no longer occurs except by subtraction of the opacified 3D image, reconstruction of opacified spin at rapid rotation (defined by $R_O$), and of the 3D image mask, reconstruction of a spin mask at rapid rotation, or even of any other spin enabling reconstruction of the object of interest without injection of contrast product (defined by $R_M$). In particular, spin at slower rotation will accumulate the number of projections necessary for detection of weak contrasts of soft tissue in the 3D image mask. This case corresponds however to an increase in the total number of projections acquired and therefore of the dose of X-rays associated with examination, without consequence for contrast resolution of the opacified 3D image which is not improved for perfused tissue.

Embodiments of the present invention consist of simultaneously using the two mask and opacified acquisitions to reconstruct the associated opacified and subtracted 3D mask images in order to reduce the number of projections necessary for detection of weak contrasts in the reconstructed 3D images. For this, it is based on temporal interpretation of acquisition with injection of contrast product in considering two temporal points: $t_O$ for the injection and $t_M$ for the mask. It hypothesises that the time changes caused by injection of contrast product are compressible. The time series to be reconstructed is therefore constituted by the vector $\vec{f} = \{f(t_O), f(t_M)\} = \{f_O, f_M\}$ for which a time transform $\vec{h} = H_t \vec{f} = \{h_\alpha, h_\delta\}$ can be defined where the constituents $h_\alpha$ and $h_\delta$ are 3D images and such that one at least of the constituents of $H_t \vec{f}$ is parsimonious.

This hypothesis proposes a method of reconstruction for compensating sub-sampling of variations linked to injection, and therefore more particularly improving reconstruction of the subtracted 3D image. A corollary to the hypothesis of compressibility is that the parts not affected by the contrast product are redundant in the acquisitions, and must therefore be determined by the set of available data $\vec{p} = \{p(t_O), p(t_M)\} = \{p_O, p_M\}$ according to the relationship $R \vec{f} = \vec{p}$ with R diagonal operator by block, where each block of the diagonal models spin, or $R = \text{diag}\{R(t_M), R(t_O)\} = \text{diag}\{R_M, R_O\}$. So, without making a hypothesis of compressibility on the mask and opacified 3D images themselves, improved reconstruction of their common parts is obtained because of $H_t$. A novel consequence of this analysis is that it is then advantageous to take $R(t_M) \neq R(t_O)$ to make the two acquisitions as complementary as possible.

In particular, if $R(t_M)$ samples a circular trajectory with an angular pitch $\delta\theta$, and if $R(t_O)$ samples a circular trajectory with the same angular pitch $\delta\theta$, they will be offset by $\delta\theta/2$ in embodiments of the present invention so that the operator $R = \text{diag}\{R(t_O), R(t_M)\}$ corresponds to a sampling of a circular trajectory with an angular pitch of $\delta\theta/2$. It is evident that angular sampling for the same number of projections is doubled (and therefore the same dose of X-rays) relative to the common case where $R(t_M) = R(t_O)$.

BRIEF SUMMARY OF THE INVENTION

According to an embodiment of the present invention, a method for processing a sequence of a plurality of 2D projection images of an object of interest, acquired with a medical imaging system comprising a source of X-rays adapted to move around the object, is provided. The method comprises obtaining 2D projection images of the object of interest according to a plurality of angulations at a first time when the object is without injection of a contrast product, the 2D projection images being such that $R_M f_M = p_M$, where $p_M$ are the projection images at the first time, $f_M$ is the 3D image of the object at the first time and $R_M$ is a projection operator which models acquisition by the imaging system at the first time. The method also comprises obtaining 2D projection images of the object of interest according to a plurality of angulations at a second time when the object is opacified by injection of a contrast product, the 2D projection images being such that $R_O f_O = p_O$, where $p_O$ are the projection images at the second time, $f_O$ is the 3D image of the object at the second time and $R_O$ is a projection operator which models acquisition by the imaging system at the second time. The method further comprises iteratively treating the projection images by minimizing, relative to a sequence of 3D images, the function:

$$J(\vec{g}, \lambda) = \lambda S(\vec{g}) + Q(\vec{g}),$$

where $Q(\vec{g})$ is a term of fidelity to the measurements acquired;

$S(\vec{g}) = \|\Phi_{xyz} H_t \vec{g}\|_1$ is a restriction where $H_t$ is a decomposition time such that $\vec{h} = H_t \vec{g}$ with $\vec{h} = \{h_\alpha, h_\delta\}$ combination of the two constituents of $\vec{g}$ and where $\Phi_{xyz} \vec{h} = \{\Phi_\alpha h_\alpha, \Phi_\delta h_\delta\}$ defines two spatial transforms of compression of both constituents of $\vec{h}$, restriction, which will improve the determining of variations linked to the injection, supposedly compressible variations, and select parts common to both images $g(t_O)$ and $g(t_M)$ which will be determined at the same time from the projection images at the first time and the projection images at the second time; and $\lambda$ is a parameter of compressibility.

Also, the minimizing solution is a set of 3D images estimated from:

$$\vec{f} = \{f_O, f_M\},$$

where $\vec{f}$ represents the 3D image of the object at both of the first and second time.

According to another embodiment of the present invention, a medical imaging system is provided. The medical imaging system comprises: an acquisition unit comprising a source of radiation, a sensor for the acquisition of a plurality of 2D projection images of an object; and a processing unit.

BRIEF DESCRIPTION OF THE DRAWINGS

Other characteristics and advantages of the invention will emerge from the following description which is purely illustrative and non-limiting and must be considered in conjunction with the attached diagrams, in which.

DETAILED DESCRIPTION OF THE INVENTION

Figure 1:
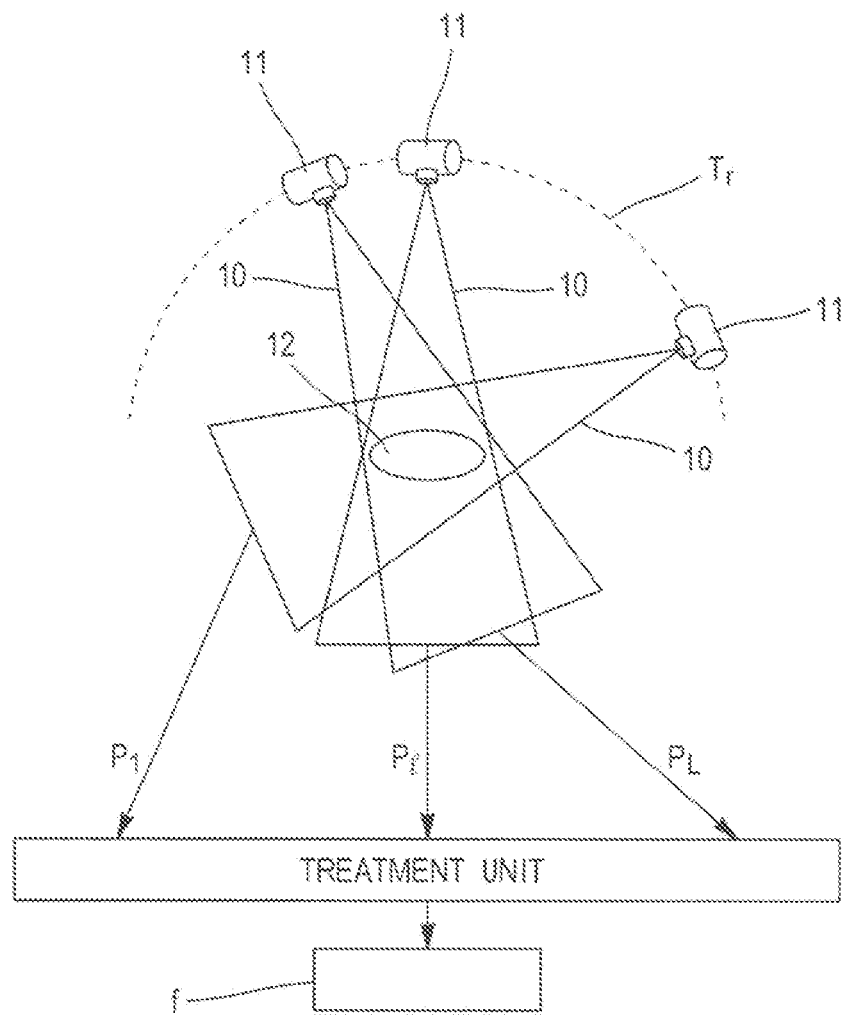
FIG. 1 schematically illustrates the acquisition of 2D images of an organ and the tomographic reconstruction of a 3D image of the organ.
Figure 2:
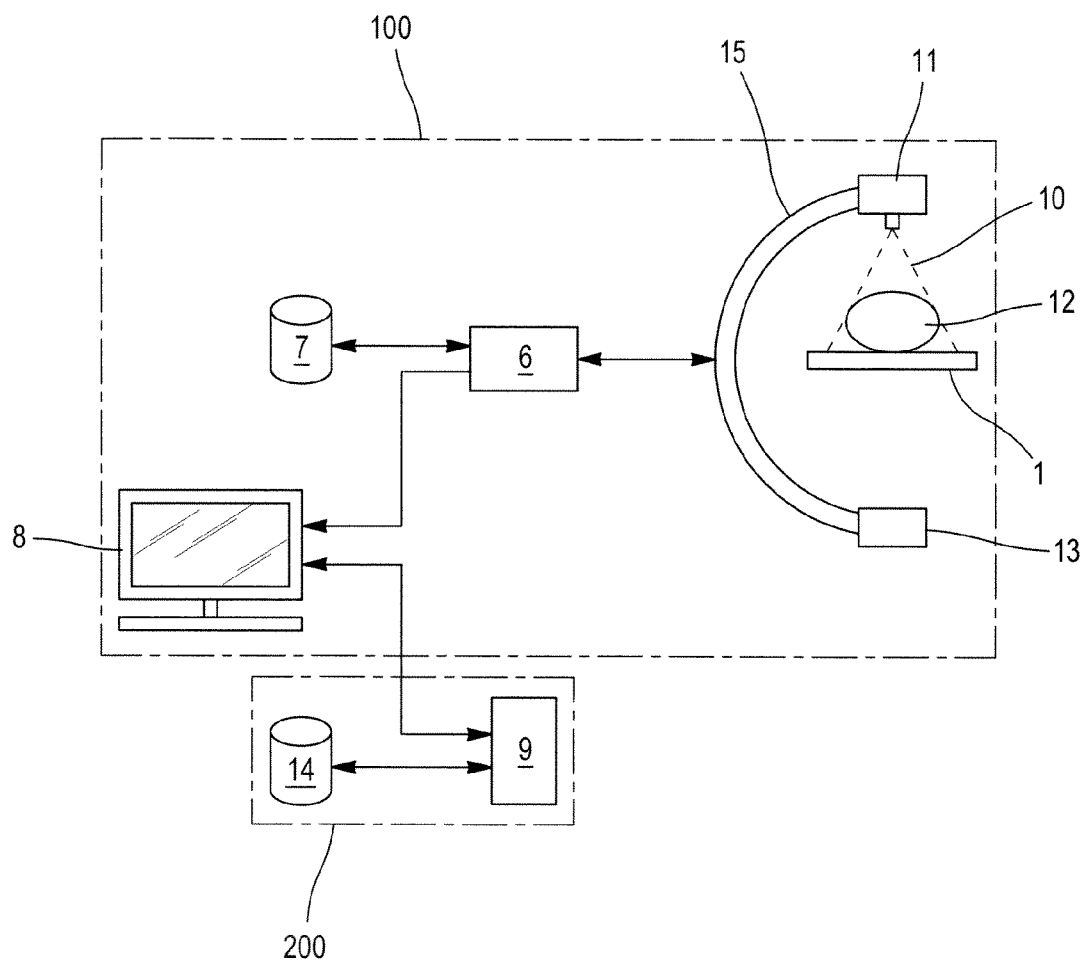
FIG. 2 schematically illustrates a medical imaging system according to an embodiment of the present invention.

FIG. 2 schematically illustrates a medical imaging system 100 for the acquisition of 2D projection images for the reconstruction of a 3D image of an organ. Such a system is used especially for the detection and characterisation of stenoses in vessels.

The medical imaging system 100 comprises a support 1 for receiving a patient 12 to be examined, a source 11 designed to emit a beam 10 of X-rays, a detector 13 arranged opposite the source 11 and configured to detect the X-rays emitted by the source 11, a control unit 6, a storage unit 7 and a display unit 8.

The source 11 of X-rays and the detector 13 are connected for example by means of an arch 15.

The detector 13 can be a semi-conductor image sensor comprising, for example, caesium phosphorous iodide (scintillater) on a matrix of transistor/photodiode of amorphous silicon. Other adequate detectors are: a CCD sensor, a direct digital detector which directly converts X-rays into digital signals. The detector 13 illustrated in FIG. 2 is planar and defines a flat image surface, while other geometries can naturally be suitable.

The control unit 6 controls the acquisition by fixing several parameters such as the dose of radiation to be emitted by the X-ray source and the positioning of the source 11 and of the detector 13. It is connected to the arch 15 by wire or wireless connection.

The control unit 6 can comprise a reading device (not shown), for example a disc reader, a CD-ROM, DVD-ROM reader, or connection ports for reading the instructions of the process for treating an instruction medium (not shown), such as a diskette, a CD-ROM, DVD-ROM, or USB flash drive or more generally by any removable memory medium or even via a network connection.

The storage unit 7 is connected to the control unit 6 for recording parameters and acquired images. It is possible to ensure that the storage unit 7 is located inside the control unit 6 or outside the control unit. The storage unit 7 can be formed by a hard drive or SSD, or any other removable and rewritable storage means (USB flash drives, memory cards etc.). The storage unit 7 can be ROM/RAM memory of the control unit 6, a USB flash drive, a memory card, central server memory.

The display unit 8 is connected to the control unit 6 for displaying the acquired images and/or information on the acquisition control parameters. The display unit 8 can be for example a computer screen, a monitor, a flat screen, plasma screen or any type of display device of known type. Such a display unit 8 allows a practitioner to control reconstruction and/or display of the 2D images acquired.

The medical imaging system 100 is coupled to a processing system 200. The processing system 200 comprises a calculation unit 9 and storage unit 10.

The processing system 200 receives the images acquired and stored in the unit memory 4 of the medical imaging system 100 from which it makes a certain number of treatments (see hereinafter), for example reconstruction of a 3D image from 2D images.

Transmission of data from the storage unit 4 of the medical imaging system 100 to the calculation unit 9 of the processing system 200 can be done over an internal or external information network or by means of any adequate physical memory medium such as diskettes, CD-ROM, DVD-ROM, external hard drive, USB flash drive, SD card, etc.

The calculation unit 9 is for example a computer or computers, a processor or processors, a microcontroller or microcontrollers, a microcomputer or microcomputers, a programmable automaton or automatons, a specific application integrated circuit or circuits, other programmable circuits, or other devices including a computer such as a workstation.

By way of variant, the calculator 9 can comprise a reading device (not shown), for example a disc reader, a CD-ROM, DVD-ROM reader, or connection ports for reading the instructions of the process for treating an instruction medium (not shown), such as a diskette, a CD-ROM, DVD-ROM, or USB flash drive or more generally by any removable memory medium or even via a network connection.

Also, the processing system comprises a storage unit 14 for storing data generated by the calculation unit 9.

The calculation unit 9 can be connected to the display unit 8 (as in FIG. 2) or else to another display unit (not shown).

The image processing method is for example implemented in the treatment unit 200 of the medical imaging system illustrated in FIG. 2. The image processing method reconstructs a sequence of two 3D images $\vec{f}=\{f(t_O),f(t_M)\}$ representing an object with two different times: one, noted $t_O$, with injection of contrast, the other, noted $t_M$, without, giving $t_O > t_M$ or $t_O < t_M$.

For each time, there is a set of images of 2D projections $p(t_n)$ with $t_n$ element of $\{t_O, t_M\}$, obtained by means of the medical imaging system moving according to a trajectory about the object in motion (commonly rotation, also known as spin). This trajectory can be different according to the time in question.

Figure 3:
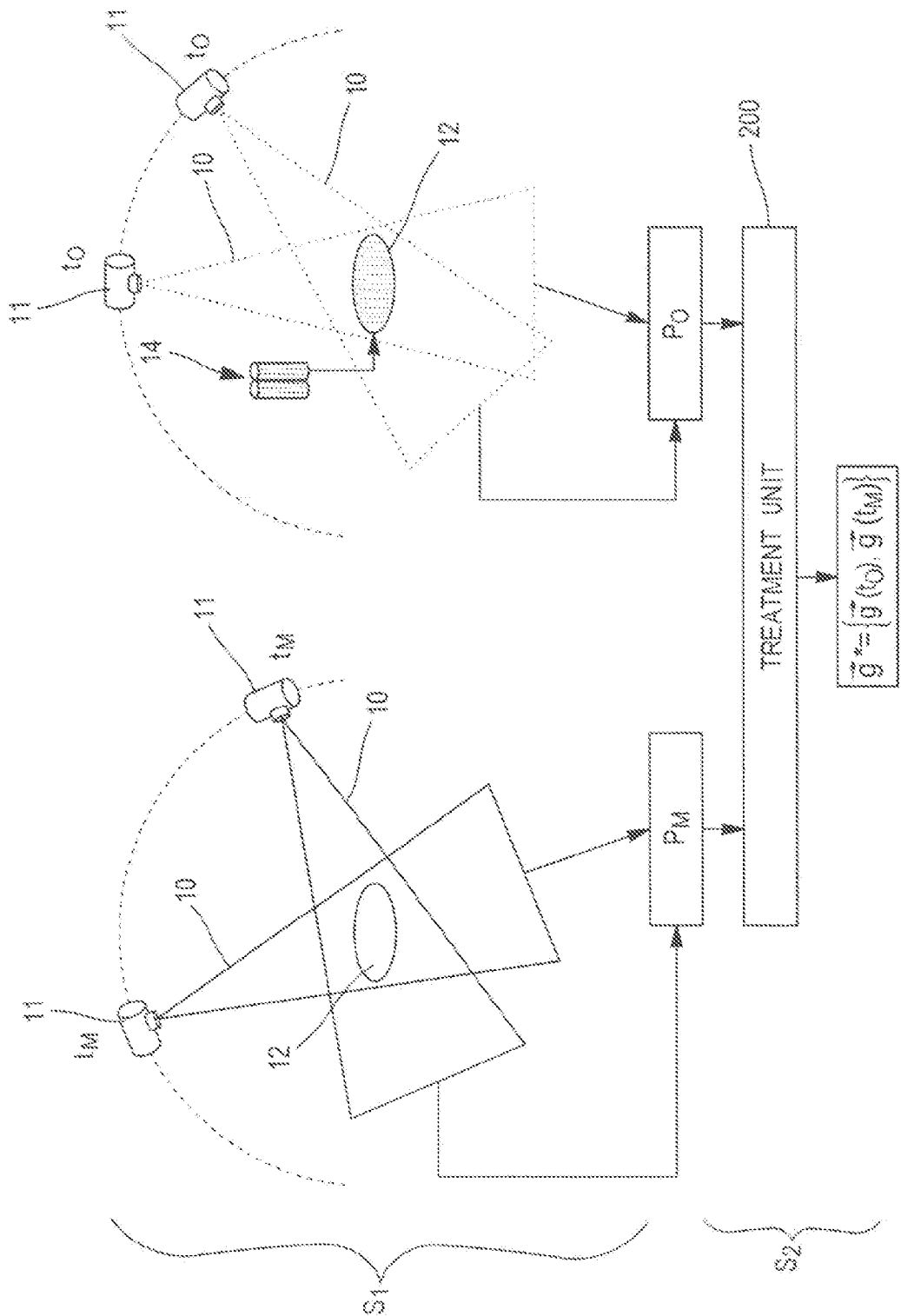
FIG. 3 is a block diagram of a process according to an embodiment of the present invention.
Figure 4:
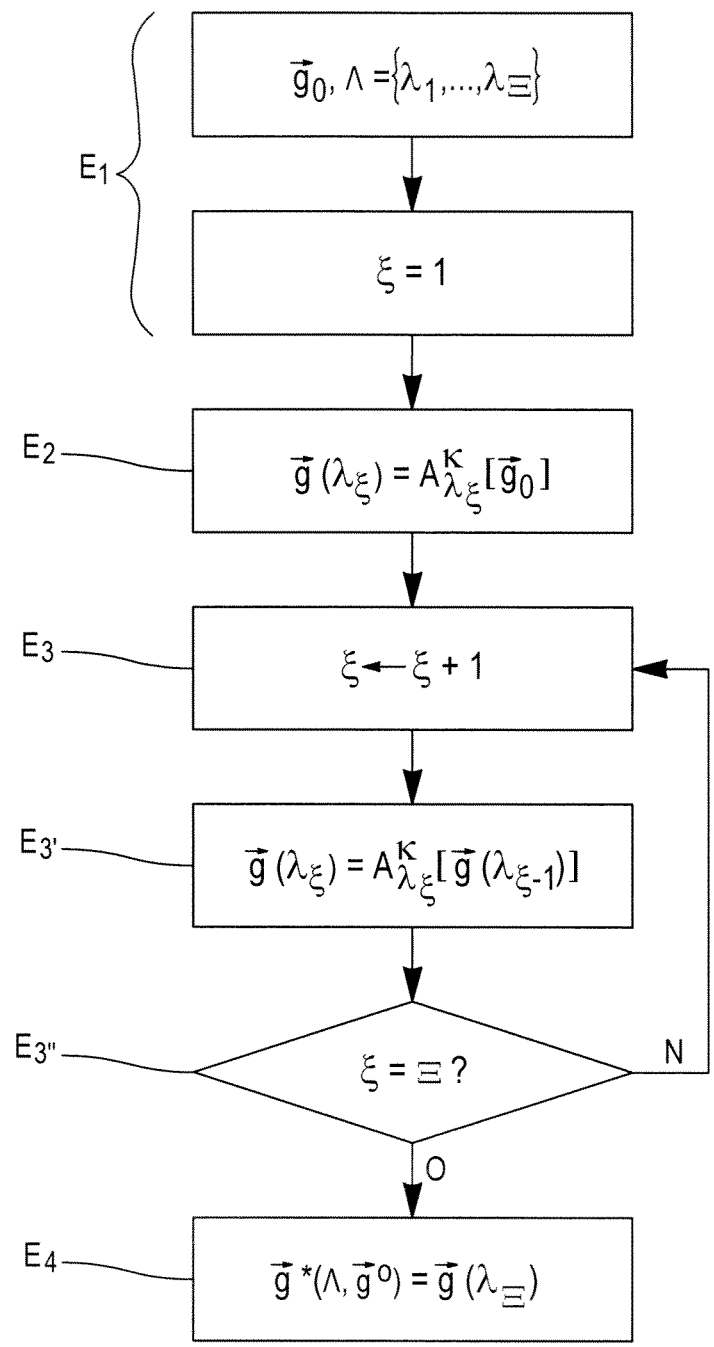
FIG. 4 schematically illustrates steps of a process according to an embodiment of the present invention.

FIG. 3 shows the acquisition of sets of 2D projection images $\vec{p}=\{p(t_O),p(t_M)\}$ of the object 12 with and without contrast product. In FIG. 3, the greyed object corresponds to the object in which a contrast product was injected by means of an injection device 14 of contrast product.

The sets of 2D projection images $\vec{p}$ are, for example, previously acquired and recovered from the storage unit 14 of the processing unit 200 of the medical imaging system 100 and treatment of 2D projection images is carried out in the calculator 9 of the processing unit 200 of the medical imaging system.

Each plurality of sequences of 2D projection images $p(t_n)$ is such that $R(t_n)f(t_n)=p(t_n)$. $R=\text{diag}\{R(t_n)\}$ for $t_n \in \{t_O,t_M\}$ is the projection operator, diagonal by block, which models sampling conducted by the medical imaging system during acquisition with and without contrast product. It verifies $R\vec{f}=\vec{p}$.

In current practice, the choice $R(t_O)=R(t_M)$ is privileged, for lack of adequate reconstruction. The reconstructed 3D images are affected by sub-sampling streaks. The aim of the invention is to propose a reconstruction method where sub-sampling can be compensated by a priori mathematics which makes it an advantage to have $R(t_O) \neq R(t_M)$ and thus increases the contrast resolution of all reconstructions.

For each time $t_n \in \{t_O,t_M\}$ of the object, the functional of the least squares following are defined:

$$Q(g, t_n) = \frac{1}{2}\|R(t_n)g - p(t_n)\|_2^2$$

where $\|\ \|_2$ symbolises the Euclidian standard known as $L_2$ and g a 3D image.

The composite functional associated with $\vec{g}=\{g(t_O),g(t_M)\}$ is defined:

$$Q(\vec{g}) = Q(q(t_o), t_o) + Q(g(t_M), t_M) = \frac{1}{2}\|R\vec{g} - \vec{p}\|_2^2.$$

The minimizing relative to $\vec{g}$ of $Q(\vec{g})$ reconstructs a sequence of 3D images $\vec{g}^*=\{g^*(t_O),g^*(t_M)\}$ of the object with and without contrast product, where the 3D image $g^*(t_O)$ is, however, considerably degraded by the reduced number of projection images contained in the sequence of images $p(t_O)$. The image $g^*(t_M)$ is also degraded if the number of 2D projections of $p(t_M)$ is the same as for $p(t_O)$, as is the case in common practice which minimizes the total dose of examination.

The document [Riddell C, Savi A, Gilardi M C, Fazio F, "Frequency weighted least squares reconstruction of truncated transmission SPECT data." IEEE Trans. Nucl. Sci. 43(4):2292-8] and [Thibault J B, Sauer K D, Bouman C A, Hsieh J., "A three-dimensional statistical approach to improved image quality for multi-slice helical CT" Med Phys. 34 (11):4526-44] contains for example functionals of least weighted squares alternative to the definition of $Q(g,t_n)$ hereinabove.

A restriction of parsimony is also defined $$S(\vec{g}) = \|\Phi_{xyz} H_t \vec{g}\|_1$$

where $\|\ \|_1$ symbolises the standard known as $L_1$ and $H_t$ is a decomposition time such that $\vec{h} = H_t \vec{g}$ with $\vec{h} = \{h_\alpha, h_\delta\}$ and $\Phi_{xyz}$ is a transform such that $\Phi_{xyz} \vec{h} = \{\Phi_\alpha h_\alpha, \Phi_\delta h_\delta\}$ with $\Phi_\alpha$ (respectively $\Phi_\delta$) transform enabling spatial compression of the 3D image constituent $h_\alpha$ (respectively $h_\delta$) of $\vec{h}$. The type of spatial compression transform (transform in wavelets, gradient, identity, ...) is defined independently for each constituent according to the hypotheses of compressibility which can be done on each of the constituents. In particular, if one of the constituents is not compressible, the transform which is associated with it is zero ($\Phi_\alpha$ or $\Phi_\delta$ is zero).

The corollary of the compressibility hypothesis linked to injection is a redundancy hypothesis of the information not affected by injection. The aim of decomposition $H_t$ is to combine the mask and opacified 3D images so that the redundant parts, in other words the parts not affected by the contrast product, and therefore common to the two images, are determined from the information available at the same time in $p(t_M)$ and $p(t_O)$.

Integration of measurements and of the compressibility hypothesis is done by defining the functional:

$$J(\vec{g}, \lambda) = \lambda S(\vec{g}) + Q(\vec{g})$$

A step of the treatment process consists of determining a sequence of images $\vec{g}^*(\lambda) = \{g^*(t_O, \lambda), g^*(t_M, \lambda)\}$ which minimize the functional $J(\vec{g}, \lambda)$ relative to $\vec{g}$ for $\lambda$ fixed and gives an estimation of $\vec{f} = \{f(t_O), f(t_M)\}$, solution of the problem of perfectly sampled tomographic reconstruction. The estimation $\vec{g}^*(\lambda)$ is such that the set of restrictions is verified: variations due to injection are determined by the data obtained at the time $t_O$ only, the redundant parts are determined from times $t_O$ and $t_M$, and the missing parts from the compressibility hypothesis.

An iterative convex optimization algorithm for minimizing $J(\vec{g}, \lambda)$ is known, for example one of those described or referenced in [Afonso M V, Bioucas-Dias J M, Figueiredo M A., "*Fast image recovery using variable splitting and constrained optimization.*" IEEE Trans Image Process. (9):2345-56] and [Beck A, Teboulle H. "*Fast gradient-based algorithms for constrained total variation image denoising and deblurring problems.*" IEEE Trans. Image Process. 18(11): 2419-34].

We note $A_\lambda$ the iteration for minimizing of $J(\vec{g}, \lambda)$ relative to $\vec{g}$ for $\lambda$ fixed and $A_\lambda^\kappa[\vec{g}]$ the sequence of 3D images results from the application of $\kappa$ iterations of the algorithm to the sequence of 3D images $\vec{g}$. For $\vec{g}^0$ fixed, for example a zero sequence, the algorithm is such that $$\lim_{\kappa \to \infty} A_\lambda^\kappa(\vec{g}^0) = \operatorname*{argmin}_{\vec{g}} J(\vec{g}, \lambda)$$

and in particular such that $$A_\lambda^\kappa(\vec{g}^0) \approx \operatorname*{argmin}_{\vec{g}} J(\vec{g}, \lambda) \text{ for } \kappa \text{ finished and sufficiently small.}$$

Current practice is fixing a priori an optimal value $\lambda^*$ of $\lambda$. This additional knowledge can be circumvented by a process of degressive restriction, that is, by definition of a decreasing sequence of degrees of compressibility $\Lambda = \{\lambda_1, \ldots, \lambda_\Xi\}$ such that $\lambda_1 > \ldots > \lambda_\Xi \geq 0$ for which $\vec{g}^0$ an estimation $\vec{g}^*(\Lambda, \vec{g}^0)$ of $\vec{f}$ solution of the problem of perfectly sampled tomographic reconstruction is determined from the arbitrary sequence, according to:

$$\begin{cases} \vec{g}^0, \Lambda = \{\lambda_1, \ldots, \lambda_\Xi\} \text{ gives} \\ \vec{g}(\lambda_1) = A_{\lambda_1}^\kappa[\vec{g}^0] \\ \vec{g}(\lambda_\xi) = A_{\lambda_\xi}^\kappa[\vec{g}(\lambda_{\xi-1})] \forall \xi \in \{2, \ldots, \Xi\} \\ \vec{g}^*(\Lambda, \vec{g}^0) = \vec{g}(\lambda_\Xi) \end{cases}$$

To explain the unfolding of the process for obtaining $\vec{g}^*(\Lambda, \vec{g}^0)$ which is the approximate solution to the problem, $E_1$, $\vec{g}^0$ and $\Lambda$ are fixed. $E_2$, the sequence $\vec{g}(\lambda_1) = A_{\lambda_1}^\kappa[\vec{g}^0]$ is determined which is the sequence minimising the functional $J(\vec{g}, \lambda_1)$ relatively to $\vec{g}$ for $\lambda_1$ fixed starting out from $\vec{g}^0$.

Next, $\vec{g}(\lambda_\xi) = A_{\lambda_\xi}^\kappa[\vec{g}(\lambda_{\xi-1})]$ $\forall \xi \in \{2, \ldots, \Xi\}$ is determined iteratively $E_3$, $E_3'$, $E_3''$ which corresponds to the sequence $\vec{g}(\lambda_\xi)$ minimising the functional $J(\vec{g}, \lambda_\xi)$ relative to $\vec{g}$ for $\lambda_\xi$ fixed starting out from $\vec{g}(\lambda_{\xi-1})$, resulting in $E_4$, $\vec{g}^*(\Lambda, \vec{g}^0)$ the approximate solution to the problem of tomographic reconstruction. The numbers of the steps do not correspond to the diagram which is itself erroneous: the arrow must return to step E3.

The number of approximations $\Xi$ and the number of iterations by approximation $\kappa$ are fixed such that they form the best compromise between the quality of $\vec{g}^*(\Lambda, \vec{g}^0)$ and the calculation time necessary for generation of $\vec{g}^*(\Lambda, \vec{g}^0)$ which are both proportional to $\Xi$ and $\kappa$.

As a variant, the number of iterations $\kappa$ is advantageously selected depending on the degree of compressibility $\lambda_\xi$ and inversely proportional to the latter.

The sequence of 3D images $\vec{g}^*(\Lambda, \vec{g}^0)$ therefore represents reconstruction of the object at times $t_M$ and $t_O$, that is, with and without injection of contrast.

Transforms and algorithms illustrating the invention as described are explained. The minimizing iteration $A_\lambda$ of $J(\vec{g}, \lambda) = \lambda S(\vec{g}) + Q(\vec{g})$ can be written as:

$$A_\lambda[\vec{g}] = \operatorname{prox}S_{\tau = \rho\lambda}[\vec{g} - \rho \nabla Q(\vec{g})]$$

where:

$\nabla Q(\vec{g})$ is the gradient of $Q(\vec{g})$, $\rho$ is a scalar such as $\rho \|\nabla Q(\vec{g})\| < 1$ $\forall \vec{g}$, and $$\operatorname{prox}S_{\tau = \rho\lambda}[\vec{g}] = \operatorname*{argmin}_{\vec{k}} \left\{ \|\vec{k} - \vec{g}\|_2^2 + \tau \|S(k)\|_1 \right\}$$

is the proximal operator for applying the parsimony restriction.

In addition, if $H_t$ is defined by the Haar transform itself defined by $h_\alpha = g(t_O) + g(t_M)$ and $h_\delta = g(t_O) - g(t_M)$, it is clear that $h_\delta$ is the subtracted 3D image. If the hypothesis is made that $h_\delta$ contains only contrast vessels, $h_\delta$ is naturally parsimonious and $\Phi_{xyz}$ can be defined such that $\Phi_{xyz} H_t \vec{g} = \{0, h_\delta\}$ and $S(\vec{g}) = \|h_\delta\|_1$. This gives $\operatorname{prox}S_\tau[\vec{g}] = H_t^{-1}\{h_\alpha, T_\tau h_\delta\}$ where $T_\tau$ is a operator of soft thresholding of threshold $\tau$ which inserts in between the Haar transform $H_t$ and its inverse $H_t^{-1}$.

Alternatively, $\Phi_{xyz}H_t\vec{g}=\{\mu|\nabla h_\alpha|,|\nabla h_\delta|\}$ can be defined where $\nabla$ represents the gradient of a 3D image, such that $S(\vec{g})=\mu\|\nabla h_\alpha\|_1+\|\nabla h_\delta\|_1$. This restriction, known as total variation, is applied to each of the constituents of $\vec{h}$. This gives proxS$_\tau[\vec{g}]=H_t^{-1}\{F_{\tau\mu}h_\alpha,F_\tau h_\delta\}$ where $F_\tau$ and $F_{\tau\mu}$ are the filters of total parameter variation $\tau$ and $\tau\mu$ respectively with $\mu$ real positive or zero which modulates the force of total variation following the constituent of $\vec{h}$. The restriction therefore returns to filter each constituent of the Haar transform with a filter of total variation of different force. Since the degree of parsimony of $h_\alpha$, an image containing the mask, is supposed to be smaller than the degree of parsimony of $h_\delta$, an image of vessels, this results in $0\le\mu<1$.

These two choices are valid irrespectively of the definitions of $R(t_n)$. However, if $R(t_M)$ samples a circular trajectory with an angular pitch $\delta\theta$, and if $R(t_O)$ samples a circular trajectory with the same angular pitch $\delta\theta$, it is advantageous with this invention to take $R(t_M)\ne R(t_O)$ and offsets of $\delta\theta/2$ so that the operator $R=\mathrm{diag}\{R(t_O),R(t_M)\}$ corresponds to a sampling of a circular trajectory with an angular pitch of $\delta\theta/2$. This choice doubles the angular sampling for the same total number of projections (and therefore the same dose of X-rays) relative to the current common case where $R=R(t_M)=R(t_O)$. More generally, if $\{\alpha_{M,1},\ldots,\alpha_{M,N_M}\}$ the set of $N_M$ angulations contained in $R(t_M)$ and $\{\alpha_{O,1},\ldots,\alpha_{O,N_O}\}$ the set of $N_O$ angulations contained in $R(t_O)$ are noted, these sets are selected such that there are two sub-assemblies of N angles $\{\beta_{M,1},\ldots,\beta_{M,N}\}\subset\{\alpha_{M,1},\ldots,\alpha_{M,N_M}\}$ and $\{\beta_{O,1},\ldots,\beta_{O,N}\}\subset\{\alpha_{O,1},\ldots,\alpha_{O,N_O}\}$ defining two rotations of angular pitch $\Delta\theta$ offset by an angle $0<\phi<\Delta\theta$, or: $\forall i\in\{1,\ldots,N\}$ $\beta_{M,i}=i\Delta\theta$ $|\beta_{M,i}-\beta_{O,i}|=\phi$.

The treatment process of radiological images can be advantageously implemented as a computer program comprising machine instructions for executing the process.

What is claimed is:

1. A method for processing a sequence of a plurality of 2D projection images of an object of interest, acquired with a medical imaging system comprising a source of X-rays adapted to move around the object, the method comprising:
   obtaining 2D projection images of the object of interest according to a plurality of angulations at a first time when the object is without injection of a contrast product, the 2D projection images being such that $R_M f_M = p_M$, where $p_M$ are the projection images at the first time, $f_M$ is the 3D image of the object at the first time and $R_M$ is a projection operator which models acquisition by the imaging system at the first time;
   obtaining 2D projection images of the object of interest according to a plurality of angulations at a second time when the object is opacified by injection of a contrast product, the 2D projection images being such that $R_O f_O = p_O$, where $p_O$ are the projection images at the second time, $f_O$ is the 3D image of the object at the second time and $R_O$ is a projection operator which models acquisition by the imaging system at the second time;
   iteratively treating the projection images by minimizing, relative to a sequence of 3D images, the function:

$$J(\vec{g},\lambda)=\lambda S(\vec{g})+Q(\vec{g}),$$

where
   $Q(\vec{g})$ is a term of fidelity to the measurements acquired;
   $S(\vec{g})=\|\Phi_{xyz}H_t\vec{g}\|_1$ is a restriction where $H_t$ is a decomposition time such that $\vec{h}=H_t\vec{g}$ with $\vec{h}=\{h_\alpha,h_\delta\}$ combination of the two constituents of $\vec{g}$ and where $\Phi_{xyz}\vec{h}=\{\Phi_\alpha h_\alpha,\Phi_\delta h_\delta\}$ defines two spatial transforms of compression of both constituents of $\vec{h}$, restriction, which will improve the determining of variations linked to the injection, supposedly compressible variations, and select parts common to both images $g(t_O)$ and $g(t_M)$ which will be determined at the same time from the projection images at the first time and the projection images at the second time; and
   $\lambda$ is a parameter of compressibility,
   wherein the minimizing solution is a set of 3D images estimated from:

$$\vec{f}=\{f_O,f_M\},$$

where $\vec{f}$ represents the 3D image of the object at both of the first and second time.

2. The method as claimed in claim 1, in which minimizing comprises defining a decreasing sequence of degrees of compressibility for which the estimation of $\vec{f}=\{f_O,f_M\}$ is determined from an initial sequence according to:

$$\begin{cases} \vec{g}^0, \Lambda=\{\lambda_1,\ldots,\lambda\Xi\} \text{ gives} \\ \vec{g}(\lambda_1)=A_{\lambda_1}^\kappa[\vec{g}^0] \\ \vec{g}(\lambda\xi)=A_{\lambda_\xi}^\kappa[\vec{g}(\lambda_{\xi-1})]\forall\xi\in\{2,\ldots,\Xi\} \\ \vec{g}^*(\Lambda,\vec{g}^0)=\vec{g}(\lambda\Xi) \end{cases}$$

where $\vec{g}^0$ is the initial sequence, $A_\lambda$ is the iteration of an algorithm for the minimizing of $J(\vec{g},\lambda)$ relative to $\vec{g}$ for $\lambda$ fixed and $A_\lambda^\kappa[\vec{h}]$ is the sequence of 3D images resulting from the application of $\kappa$ iterations of the algorithm $A_\lambda$ to a sequence of 3D images $\vec{h}$.

3. The method as claimed in claim 1, wherein $H_t$ is the Haar transform defined by:

$$h_\alpha=g(t_O)+g(t_M) \text{ and } h_\delta=g(t_O)-g(t_M).$$

4. The method as claimed in claim 1, wherein $\Phi_{xyz}$ is such that:

$$\Phi_{xyz}H_t\vec{g}=\{0,h_\delta\},$$

such that:

$$S(\vec{g})=\|h_\delta\|_1.$$

5. The method as claimed in claim 1, in which $\Phi_{xyz}$ is such that:

$$\Phi_{xyz}H_t\vec{g}=\{\mu\nabla h_\alpha,\nabla h_\delta\},$$

where $\nabla h_\alpha$ and $\nabla h_\delta$ are respectively the gradients of $h_\alpha$ and $h_\delta$, such that:

$$S(\vec{g})=\mu\|\nabla h_\alpha\|_1+\|\nabla h_\delta\|_1 \text{ with } \mu\ge 0.$$

6. The method as claimed in claim 2, wherein the initial sequence is a zero sequence.

7. The method as claimed in claim 1, wherein the pluralities of angulations comprise two sub-assemblies of angles each, the two sub-assemblies corresponding to two rotations of angular pitch offset by an angle, such that:

$$0<\phi<\Delta\theta,$$

where $\phi$ is the angle and $\Delta\theta$ is the angular pitch.

8. The method as claimed in claim 1, wherein the angular offset $\phi$ is equal to the semi-pitch of sampling, or wherein $\phi=\Delta\theta/2$.

9. A medical imaging system comprising:
- an acquisition unit comprising a source of radiation, a sensor for the acquisition of a plurality of 2D projection images of an object; and
- a processing unit configured to execute a method as claimed in claim 1.

* * * * *

UNITED STATES PATENT AND TRADEMARK OFFICE
CERTIFICATE OF CORRECTION

PATENT NO. : 9,058,688 B2  
APPLICATION NO. : 13/328427  
DATED : June 16, 2015  
INVENTOR(S) : Langet et al.

Page 1 of 1

It is certified that error appears in the above-identified patent and that said Letters Patent is hereby corrected as shown below:

In the specification

In Column 2, Line 47, delete "$R_M$," and insert -- $R_M$ --, therefor.

In Column 2, Line 48, delete "$f_M$," and insert -- $f_M$ --, therefor.

In Column 7, Line 45, delete "Teboulle H." and insert -- Teboulle M. --, therefor.

In Column 8, Line 24, delete "$\forall \xi \xi \{2, \ldots, \Xi\}$" and insert -- $\forall \xi \in \{2,\ldots,\Xi\}$ --, therefor.

In Column 8, Line 63, delete "h," and insert -- $h_\delta$ --, therefor.

Signed and Sealed this  
Twenty-second Day of December, 2015

Michelle K. Lee  
*Director of the United States Patent and Trademark Office*